United States Patent
Okazawa

(10) Patent No.: US 7,583,396 B2
(45) Date of Patent: Sep. 1, 2009

(54) PRINTING SYSTEM, PRINTING METHOD, AND COMPUTER PROGRAM

(75) Inventor: Takashi Okazawa, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1221 days.

(21) Appl. No.: 10/692,478

(22) Filed: Oct. 24, 2003

(65) Prior Publication Data
US 2004/0090650 A1 May 13, 2004

(30) Foreign Application Priority Data

Oct. 28, 2002 (JP) ............................. 2002-313356
Nov. 29, 2002 (JP) ............................. 2002-348728

(51) Int. Cl.
*G06F 15/00* (2006.01)
*G06F 3/12* (2006.01)
(52) U.S. Cl. ................................. 358/1.15; 358/1.13
(58) Field of Classification Search ................. 358/1.2, 358/1.9, 1.13, 1.14, 1.15, 402, 448; 709/201, 709/217, 220, 221, 224, 230
See application file for complete search history.

(56) References Cited

U.S. PATENT DOCUMENTS

| 6,614,544 | B2 | 9/2003 | Tokura |
| 6,804,019 | B2 * | 10/2004 | Shiohara ..................... 358/1.15 |
| 6,819,443 | B1 * | 11/2004 | Shima et al. ................ 358/1.15 |
| 2003/0033368 | A1 * | 2/2003 | Tominaga ................... 709/203 |
| 2006/0072156 | A1 * | 4/2006 | Shima ........................ 358/1.15 |

FOREIGN PATENT DOCUMENTS

| JP | 10-283141 A | 10/1998 |
| JP | 11-042836 A | 2/1999 |
| JP | 11-265268 A | 9/1999 |
| JP | 2001-154967 A | 6/2001 |
| JP | 2002-140242 A | 5/2002 |
| JP | 2002-297465 A | 10/2002 |

OTHER PUBLICATIONS

"Windows Start: Configuration for System in Windows 95 / 98 / Companion to how to operate a Device Manager", Japanese Journal, vol. 4, No. 10, Aug. 29, 1999, Japan.
Takao Takahashi.: "An exhaustive study on a Print Server! / Axis Communications: Print Point 560/ 100", Japanese Journal, Sep. 25, 1998, Japan.

* cited by examiner

*Primary Examiner*—Gabriel I Garcia
(74) *Attorney, Agent, or Firm*—Cannon USA Inc IP Division

(57) ABSTRACT

A printing system includes a print control device, a network interface device, and an information processing device. The information processing device acquires configuration information of the network interface device from the network interface device connecting the print control device to a network, and generates print data representing the configuration information of the network interface device based on the acquired configuration information. The printing system thus prints out the configuration information of the network interface device.

13 Claims, 16 Drawing Sheets

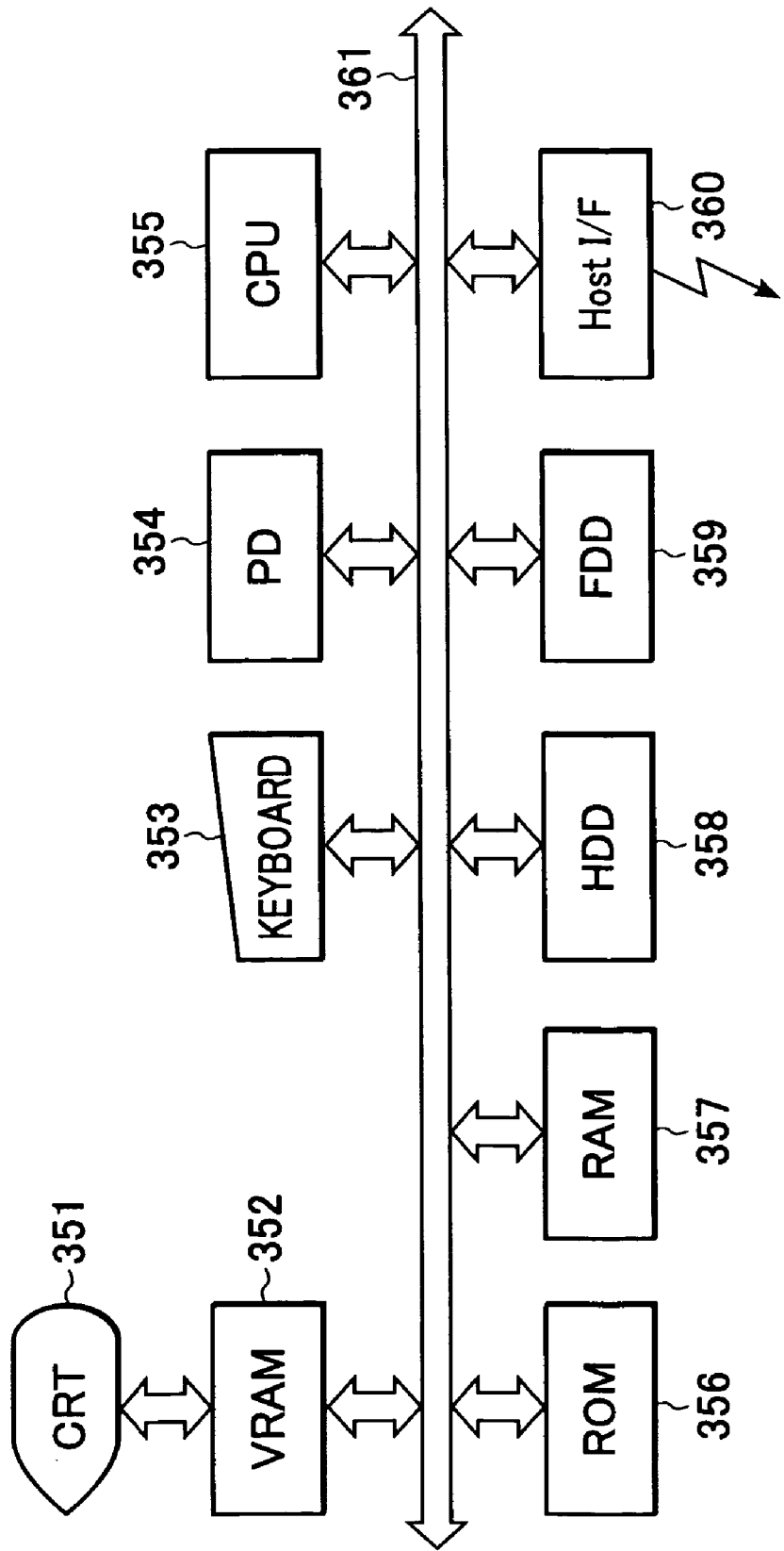

FIG. 8

```
MODEL NAME OF NETWORK ADAPTOR : NB-XX
#-----
MODEL NAME : LASER SHOOT P-XXXX
ACTIVE LANGUAGE : ENGLISH
CAPT I/F VERSION : 2.01
INTERFACE : Fast Ethernet 10/100 BaseT
DATA RATE : 10/100 Mbps
MAC ADDRESS : 00 : 00 : 85 : XX : XX : XX
FIRMWARE VERSION : 1.00 beta
CANON-MIB VERSION : 2.50
GENERAL INFORMATION
          PRINT SERVER NAME : OANON112008
TCP/IP
          TCP/IP : Enabled
          IP ADDRESS : 192. 168. 3. 215
          SUB-NETMASK : 255. 255. 255. 0
          GATEWAY ADDRESS : 192. 168. 3. 1
          DHCP : OFF
          BOOTP : OFF
          RARP : OFF
          DNS SERVER ADDRESS : 192. 168. 3. 2
          DNS SERVER DYNAMIC UPDATING : OFF
          DNS HOST NAME : OANON112008
          DNS DOMAIN NAME : oanon.co.jp
          SMTP SERVER NAME : smtpsvr.oanon.co.jp
          WINS SERVER ADDRESS : 192. 168. 3. 3
          SCOPE ID : AAAAAAAAAA.BBBBBBBBBB.CCCCCCCCCC
          SNMP ACCESS : ON
          COMMUNITY CHARACTER STRING : smtpsvt.oanon.co.jp
          NTP SERVER NAME : 192. 168. 3. 4
NetBIOS
          BASE PROTOCOL : NetBEUI
TCP/IP PRINT LIMITATIONS
          PRINT LIMITATION : ON
          PRINT LIMITATION MODE : PRINTING FROM DESIGNATED
                                        ADDRESS PERMITTED
          PRINT LIMITATION DESIGNATING ADDRESS :
             :
             :
TCP/IP SETTING LIMITATIONS
          SETTING LIMITATION : ON
          SETTING LIMITATION MODE : SETTING FROM DESIGNATED
                                        ADDRESS DENIED
          SETTING LIMITATION DESIGNATING ADDRESS :
             :
             :
[EOF]
```

FIG. 9

```
                                    CONFIG PRINT      NB-XX

MODEL NAME                          : LASER SHOOT P-XXXX
ACTIVE LANGUAGE                     : ENGLISH
CAPT I/F VERSION                    : 2.01
INTERFACE                           : Fast Ethernet 10/100 BaseT
DATA RATE                           : 10/100 Mbps
MAC ADDRESS                         : 00 : 00 : 85 : XX : XX : XX
FIRMWARE VERSION                    : 1.00 beta
CANON-MIB VERSION                   : 2.50
GENERAL INFORMATION
      PRINT SERVER NAME             : OANON112008
TCP/IP
      TCP/IP                        : Enabled
      IP ADDRESS                    : 192. 168. 3. 215
      SUB-NETMASK                   : 255. 255. 255. 0
      GATEWAY ADDRESS               : 192. 168. 3. 1
      DHCP                          : OFF
      BOOTP                         : OFF
      RARP                          : OFF
      DNS SERVER ADDRESS            : 192. 168. 3. 2
      DNS SERVER DYNAMIC UPDATING   : OFF
      DNS HOST NAME                 : OANON112008
      DNS DOMAIN NAME               : oanon.co.jp
      SMTP SERVER NAME              : smtpsvr.oanon.co.jp
      WINS SERVER ADDRESS           : 192. 168. 3. 3
      SCOPE ID                      : AAAAAAAAAA.BBBBBBBBBB.CCCCCCCCCC
      SNMP ACCESS                   : ON
      COMMUNITY CHARACTER STRING    : smtpsvt.oanon.co.jp
      NTP SERVER NAME               : 192. 168. 3. 4
NetBIOS
      BASE PROTOCOL                 : NetBEUI
TCP/IP PRINT LIMITATIONS
      PRINT LIMITATION              : ON
      PRINT LIMITATION MODE         : PRINTING FROM DESIGNATED
                                      ADDRESS PERMITTED
      PRINT LIMITATION DESIGNATING ADDRESS :
                                      :
                                      :
TCP/IP SETTING LIMITATIONS
      SETTING LIMITATION            : ON
      SETTING LIMITATION MODE       : SETTING FROM DESIGNATED
                                      ADDRESS DENIED
      SETTING LIMITATION DESIGNATING ADDRESS :
                                      :
                                      :
```

PRINTING SYSTEM, PRINTING METHOD, AND COMPUTER PROGRAM

BACKGROUND OF THE INVENTION

1. Field of the Invention

The present invention relates to a technique appropriate for use in a printing system including a printer device, a network interface for connecting the printer device to a network, and an information processing device.

2. Description of the Related Art

Two types of connection methods for connecting an information processing device (hereinafter referred to as a client device) such as personal computer to a printer device are known. In one connection type, a client device is connected to a printer device through a network (a network connection configuration). In the other connection type, a client device is directly connected to a printer device without a network (a local connection configuration). The client device that is connected to the printer device in the network configuration is hereinafter referred to as a network client, and the client device that is connected in the local connection configuration is hereinafter referred to as a local client.

In the network connection configuration, the printer device includes a network interface, and a print controller as a device main unit. The device main unit is connected to a network through the network interface. The network interface communicates information over the network between the device main unit and a network client terminal present on the network. In the local connection configuration, the device main unit communicates with a local client connected through an interface (i.e., Centronics or USB) that is different from the network interface.

A host base system with a device main unit having no page description language (PDL) is available as a system composed of a client device and a printer device. In the host base system, the client device generates and compresses print image data, and transfers the compressed image data to the printer device. The device main unit of the printer device decompresses the compressed image data and transfers the resulting image data to a printer engine for printing. Such a host base system is different from a printing system that has a device main unit having the function of interpreting a PDL.

To allow a user to check environment setting information of the network interface (configuration information), the configuration information is typically printed out. The configuration information of the network interface is preferably printed out using the device main unit. In an already accepted technique, printing of the configuration information is performed in a system where the device main unit has the function of PDL interpretation. In this case, the network interface transfers PDL data (print data in a PDL format) to the device main unit, and the device main unit expands the PDL data into image data to print the data. In other words, the configuration information is printed without performing information communications over the network.

To print out the configuration information on the above-described host base system, a print image must be transferred to the device main unit. Even if the network interface transfers PDL formatted print data, the device main unit is unable to print out the PDL formatted print data.

Typically, the network interface has no function to directly generate image data from the PDL formatted print data. The host base system has been unable to print the configuration information with the network interface and the device main unit.

SUMMARY OF THE INVENTION

It is an object of the present invention to provide a system and a method for printing configuration information of a network interface in a more efficient and easier fashion than the conventional art.

The present invention in a first aspect relates to a printing system and includes a print control device, a network interface device for connecting the print control device to a network, an information processing device which is connected to the print control device through an interface different from the network interface device, an acquisition unit, arranged in the print control device, for acquiring configuration information of the network interface device from the network interface device, a transmitting unit for transmitting the configuration information acquired by the acquisition unit from the print control device to the information processing device through the interface different from the network interface device, and a generating unit, arranged in the information processing device, for generating print data representing the configuration information of the network interface device based on the configuration information transmitted from the transmitting unit.

The present invention in a second aspect relates to a printing system and includes a print control device, a network interface device for connecting the print control device to a network, an information processing device which is connected to the network, an acquisition unit, arranged in the information processing device, for acquiring configuration information of the network interface device from the network interface device through the network, and a generating unit, arranged in the information processing device, for generating print data representing the configuration information of the network interface device based on the configuration information acquired by the acquisition unit.

The present invention in a third aspect relates to a printing method for printing configuration information of a network interface device that connects a print control device to a network, and includes an acquisition step, performed by the print control device, for acquiring the configuration information of the network interface device from the network interface device, a transmitting step for transmitting the configuration information acquired in the acquisition step from the print control device to an information processing device through an interface different from the network interface device, a generating step, performed by the information processing device, for generating print data representing the configuration information of the network interface device based on the configuration information transmitted in the transmitting step, a print data transmitting step for transmitting the print data generated in the generating step from the information processing device to the print control device through the interface different from the network interface device, and a printing step for printing the print data transmitted in the print data transmitting step.

The present invention in a fourth aspect relates to a printing method for printing configuration information of a network interface device that connects a print control device to a network, and includes an acquisition step, performed by an information processing device, for acquiring the configuration information of the network interface device from the network interface device through the network, a generating step, performed by the information processing device, for generating print data representing the configuration information of the network interface device based on the configuration information acquired in the acquisition step, a first print data transmitting step for transmitting the print data generated in the generating step from the information processing device to the network interface device through the network, a second print data transmitting step for transmitting the print data, transmitted in the first print data transmitting step, from the network interface device to the print control device, and a printing step for printing the print data transmitted in the second print data transmitting step.

The present invention in a fifth aspect relates to a computer program for printing configuration information of a network interface device that connects a print control device to a network, and includes program codes for performing an acquisition step for acquiring, through an interface different from the network interface device, the configuration information of the network interface device from the print control device that has acquired the configuration information, and a generating step for generating print data representing the configuration information of the network interface device based on the configuration information acquired in the acquisition step.

The present invention in a sixth aspect relates to a computer program for printing configuration information of a network interface device that connects a print control device to a network, and includes program codes for performing an acquisition step, performed by an information processing device, for acquiring the configuration information of the network interface device from the network interface device through the network, and a generating step, performed by the information processing device, for generating print data representing the configuration information of the network interface device based on the configuration information acquired in the acquisition step.

Further objects, features, and advantages of the present invention will be apparent from the following description of the preferred embodiments with reference to the attached drawings.

BRIEF DESCRIPTION OF THE DRAWINGS

FIG. 3A is a block diagram illustrating a hardware configuration of a local client of FIG. 1.

FIG. 8 illustrates an example of configuration information data.

FIG. 9 illustrates a printout of the configuration information data of FIG. 8.

DESCRIPTION OF THE PREFERRED EMBODIMENTS

The preferred embodiments of the present invention are discussed with reference to the drawings.

In the preferred embodiments, a network interface device (hereinafter simply referred to as a network interface) transfers configuration information thereof to an information processing device such as a host terminal through a printer device, and the information processing device produces a print job (namely, print image data) based on the configuration information, and transfers the print job to the printer device. The configuration information is thus printed.

A printing system of the preferred embodiments of the present invention includes a printer device, a network interface that connects the printer device to a network, and a client device that is connected to the printer device in a local connection. In response to an acquisition request, the printer device acquires the configuration information from the network interface, and transmits the acquired configuration information to the client device through the local connection. The client device generates print data (the print job) representing the received configuration information. The configuration information is thus presented to the user.

The configuration information is printed by transmitting the print image generated by the client device to the printer device through the local connection. The configuration information is not only printed out but also presented on a display.

The printer device of a preferred embodiment of the printing system includes a first connection for connecting the client device in the local connection, and a second connection for connecting to a network interface connectable to a network. In response to an acquisition command, the configuration information is acquired from the network interface through the second connection, and the acquired configuration information is then transferred to the client device through the first connection.

The information processing device (a local client) of a preferred embodiment of the printing system is connected to the printer device through the local connection. The information processing device requests the printer device connected through the local connection to send predetermined information. Upon receiving the predetermined information from the printer device through the local connection, the information processing device generates a print job based on the predetermined information.

The embodiments of the present invention are discussed in detail.

Figure 1:
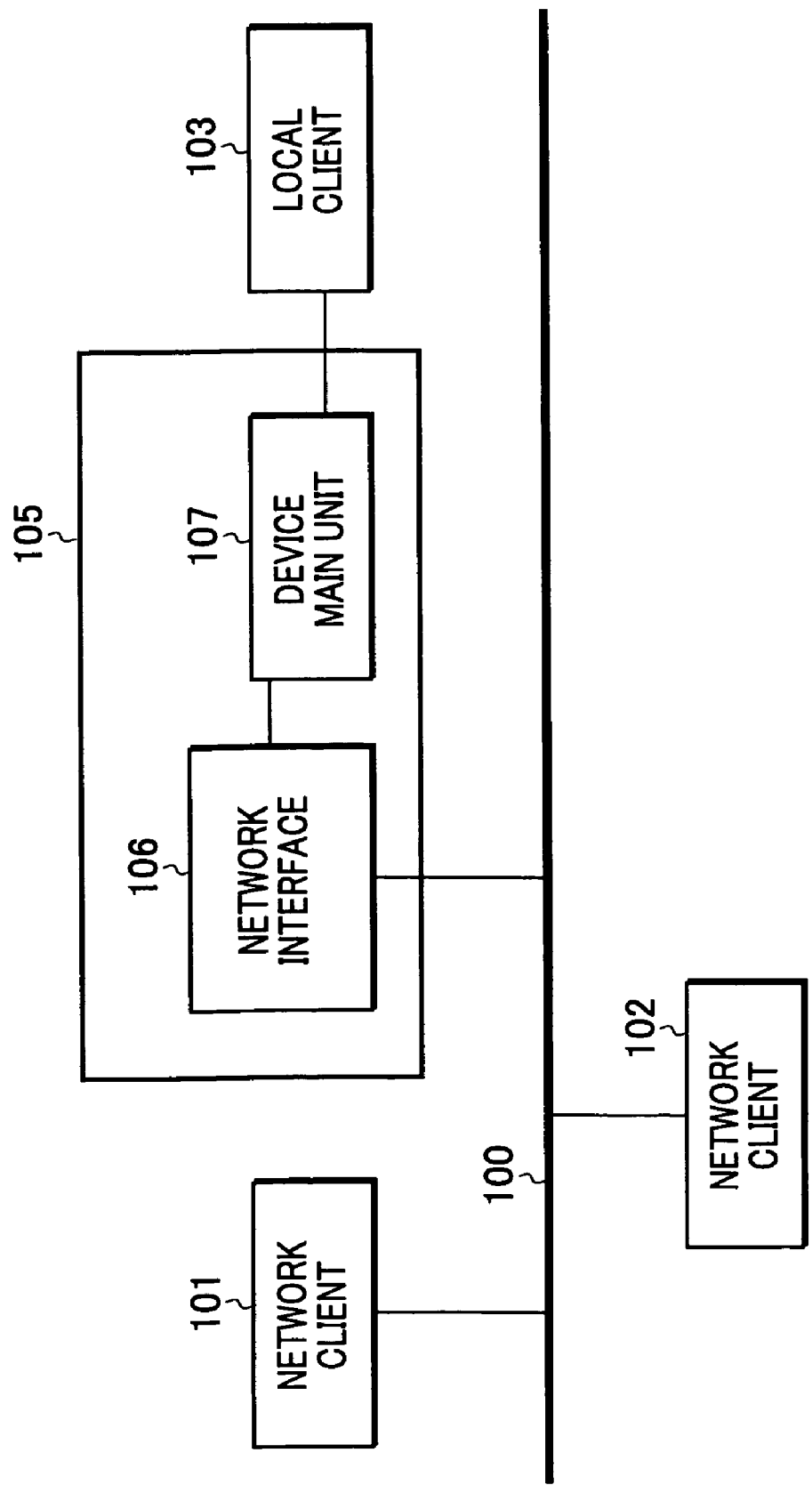
FIG. 1 illustrates a system configuration of a network system of preferred embodiments of the present invention.

FIG. 1 illustrates a system configuration of a network system of one embodiment of the present invention. Each of client devices 101 through 103 is a personal computer, for example. The client device devices 101 and 102 are network clients connected to a network 100, and the client device 103 is a local client connected to a device main unit 107 of a printer device 105 through a local connection.

Also shown in FIG. 1 is a network interface 106 of printer device 105. The network interface 106, for example, is a network board or a network card. Device main unit 107, in addition to being connected to local client 103, is also connected to each of the network client devices 101 and 102 through the network interface 106 and the network 100.

Figure 2:
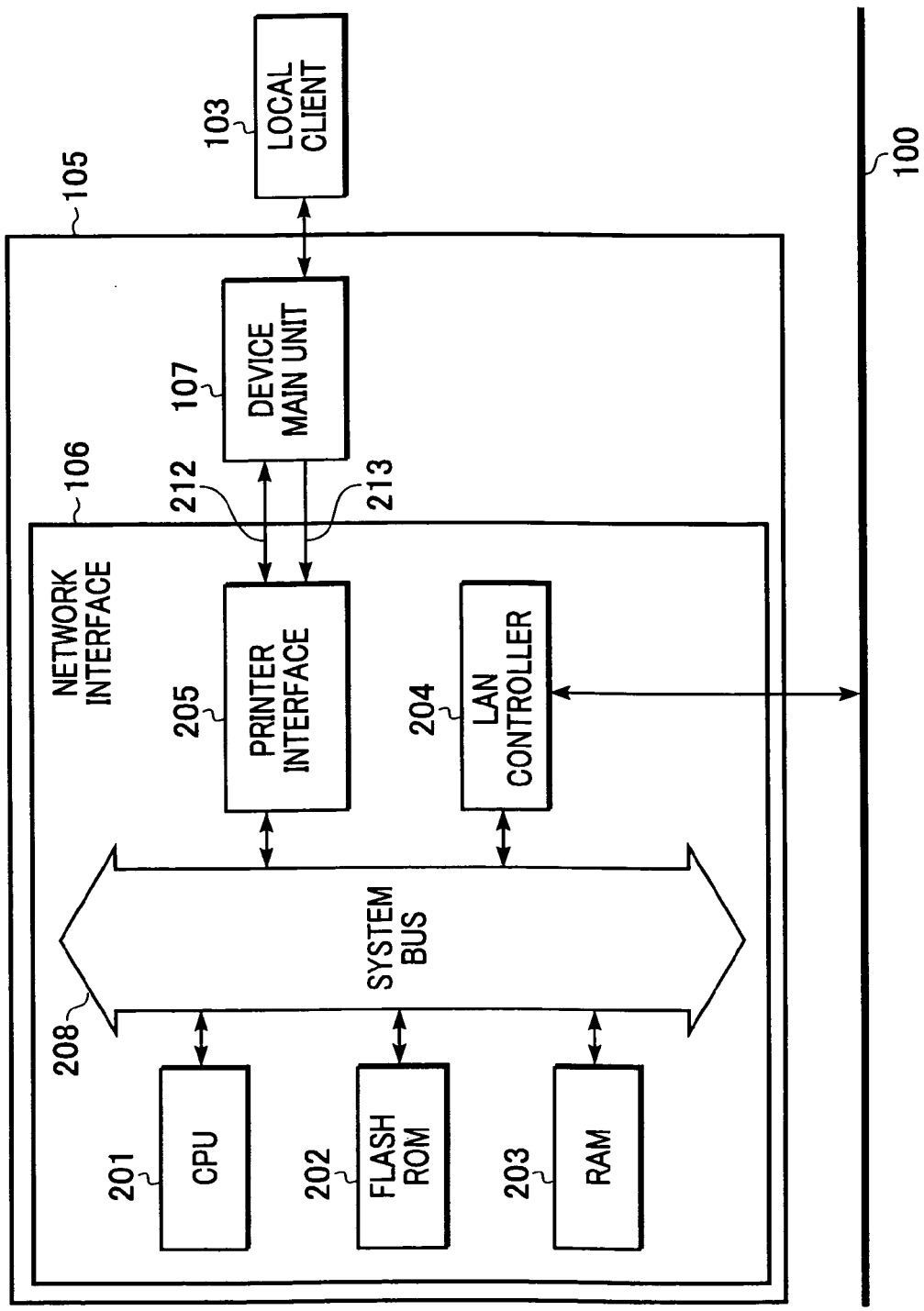
FIG. 2 is a block diagram illustrating a structure of a network interface of FIG. 1.

FIG. 2 is a block diagram illustrating a structure of the network interface 106 of FIG. 1. As shown, a CPU 201 controls each block of the network interface 106 via control programs stored in a flash ROM 202. The flash ROM 202 is partially reprogrammable, and serves as a storage area for a variety of parameters, including control programs and data. RAM 203 temporarily stores working data and parameters used by the CPU 201. The configuration information is stored in one of either the flash ROM 202 or the RAM 203 and is set and modified in response to a manual operation carried out on an operation panel, now shown, of the device main unit 107 or a command input from the outside. The configuration information may be stored in a non-volatile RAM (NVRAM) (not shown) instead of the flash ROM 202.

A LAN controller 204 communicates with the external network 100 using Ethernet® or token ring. The present invention is not limited to either of these communication protocols and any communication protocol that would allow practice of the present invention is applicable. Print image data from a client connected to the network 100 is input under the control of the LAN controller 204. In addition to the print image data, any other information or data network interface 106 exchanges with the network 100 are done through the LAN controller 204.

The printer interface 205 transmits a print job input from the external network 100 to the device main unit 107, transmits and receives printer control jobs, acquires status information of the device main unit 107, acquires device information concerning the device main unit 107, and enters settings on the device main unit 107. A TX/RX channel 212 conducts print data and control data in the printer interface 205. An attention (ATTN) signal 213 is transmitted from the device main unit 107 to the network interface 106. To transmit the ATTN signal 213, a new signal line may be added or the ATTN signal 213 may be handled as ATTN as a new command.

A system bus 208 interconnects the CPU 201, the flash ROM 202, the RAM 203, the LAN controller 204, and the printer interface 205.

FIG. 3A is a block diagram illustrating a data processing device as a local client device. A display 351 (cathode-ray tube, liquid-crystal display, etc.) displays information being processed by an application software program running on the local client device, as well as a variety of messages, and a graphical user interface that consists of among things menu and button options. Video RAM (VRAM) 352 is used to expand images that are to be displayed on the display 351. A keyboard 353 and a pointing device (PD) 354 are used to input characters on a predetermined section on the display 351 and to point to an icon or a button on a graphical user interface (GUI) displayed on display 351. A CPU 355 controls the entire data processing device.

ROM 356 stores the operational programs (procedures) that the CPU 355 executes. Among the programs stored in ROM 356 is an application program for processing data, an error processing program, and programs relating to the flow diagrams of the present invention discussed below. RAM 357 serves as a working area of the CPU 355 that executes a variety of programs and as a temporary saving area for error processing.

A hard disk drive (HDD) 358 and a floppy disk drive (FDD) 359 store application programs, data, libraries, etc. Instead of, or in addition to the FDD 359, an optical disk drive for a CD-ROM, a magneto-optical (MO) disk, digital versatile disk (DVD), a magnetic tape drive for a tape streamer, or DDS may be used.

A host interface 360 is used to connect to a printing device such as a printer. The host interface 360 is used as the TX/RX channel 212 and for the ATTN signal 213 previously described. The above-referenced elements of the local client device are all interconnected via an I/O bus 361 (including an address bus, a data bus, and a control bus).

The network client device has the same structure as discussed with reference to FIG. 3A, and further includes a network interface for connection with a network.

Figure 3B:
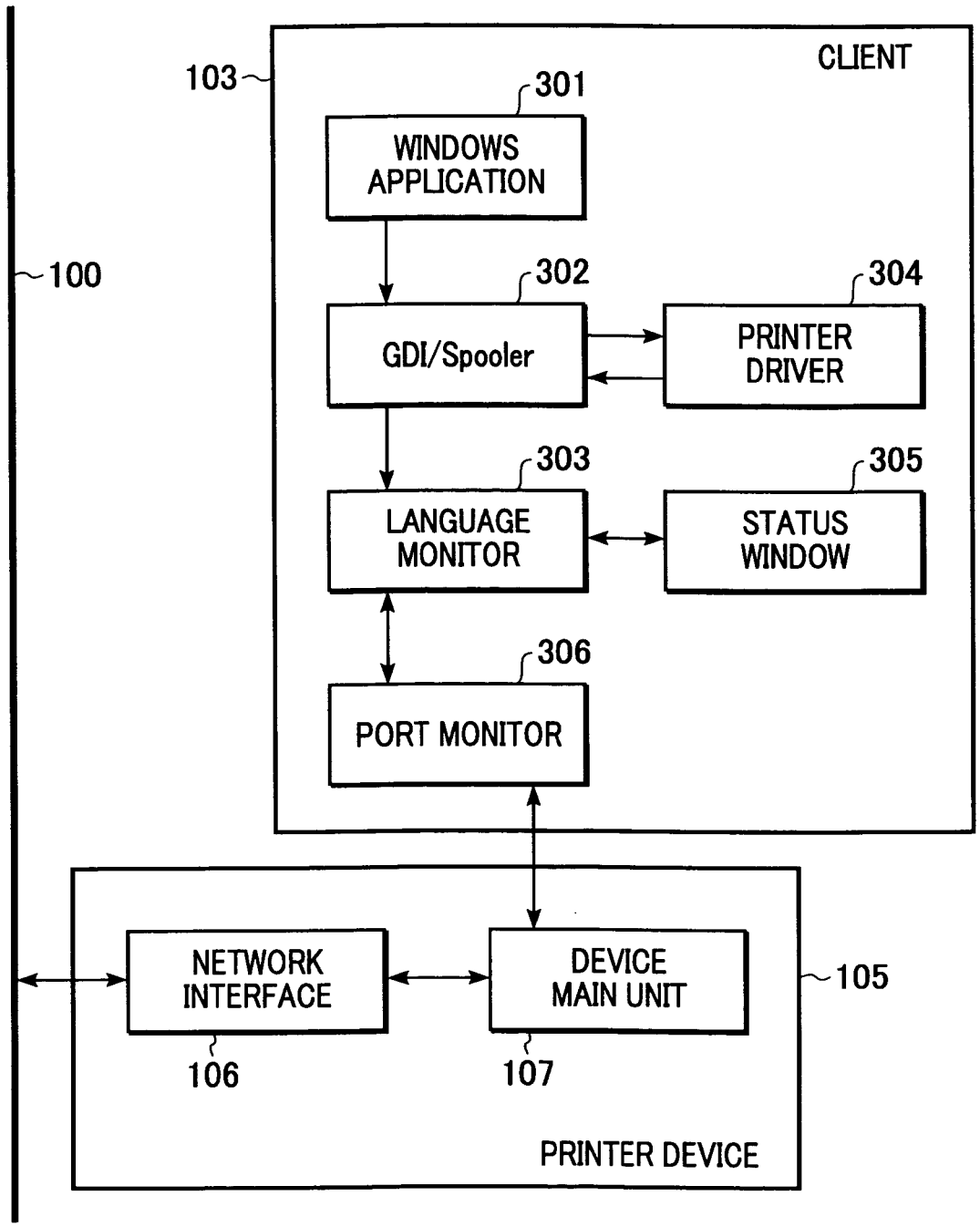
FIG. 3B is a functional block diagram of the local client of FIG. 1.

FIG. 3B is a functional block diagram of the local client 103 of FIG. 1 (FIG. 3A). The local client 103 preferably uses the Windows® operating system, but any operating system that would allow practice of the present invention is applicable.

Windows® application 301 is a typical application program such as Microsoft Word® or Microsoft Excel®. A GDI/Spooler 302 acts as an interface between the application 301 and a printer driver 304, and one of its tasks is to perform a spooling function.

A language monitor 303 divides the print data generated by the printer driver 304 on a page-basis, and performs a screen process, a print order process, a collation process, a multi-copying process, and a sheet size management process for selecting a sheet feeder on the print data. The resulting print data is transferred to a printer port 306. The language monitor 303 also monitors the status of the printer device, and provides a status manager (not shown) with the printing status.

The printer driver 304 generates image data in a bit-map format in accordance with a command from the application, compresses the image data, and outputs the compressed image data. A status window 305 receives printer device status information from the language monitor 303, and displays the status information on a screen (i.e., display 351). The status window 305 also transfers a job control request to the language monitor 303. A port monitor 306 communicates with the device main unit 107 of printer device 105 through an interface such as a parallel interface, a Centronics interface, or a USB interface.

The configuration information of the network interface 106 is printed using the device main unit 107 in the host base system described above in accordance with the preferred embodiment of the present invention. The printing operation of the host base system is discussed below.

Figure 4:
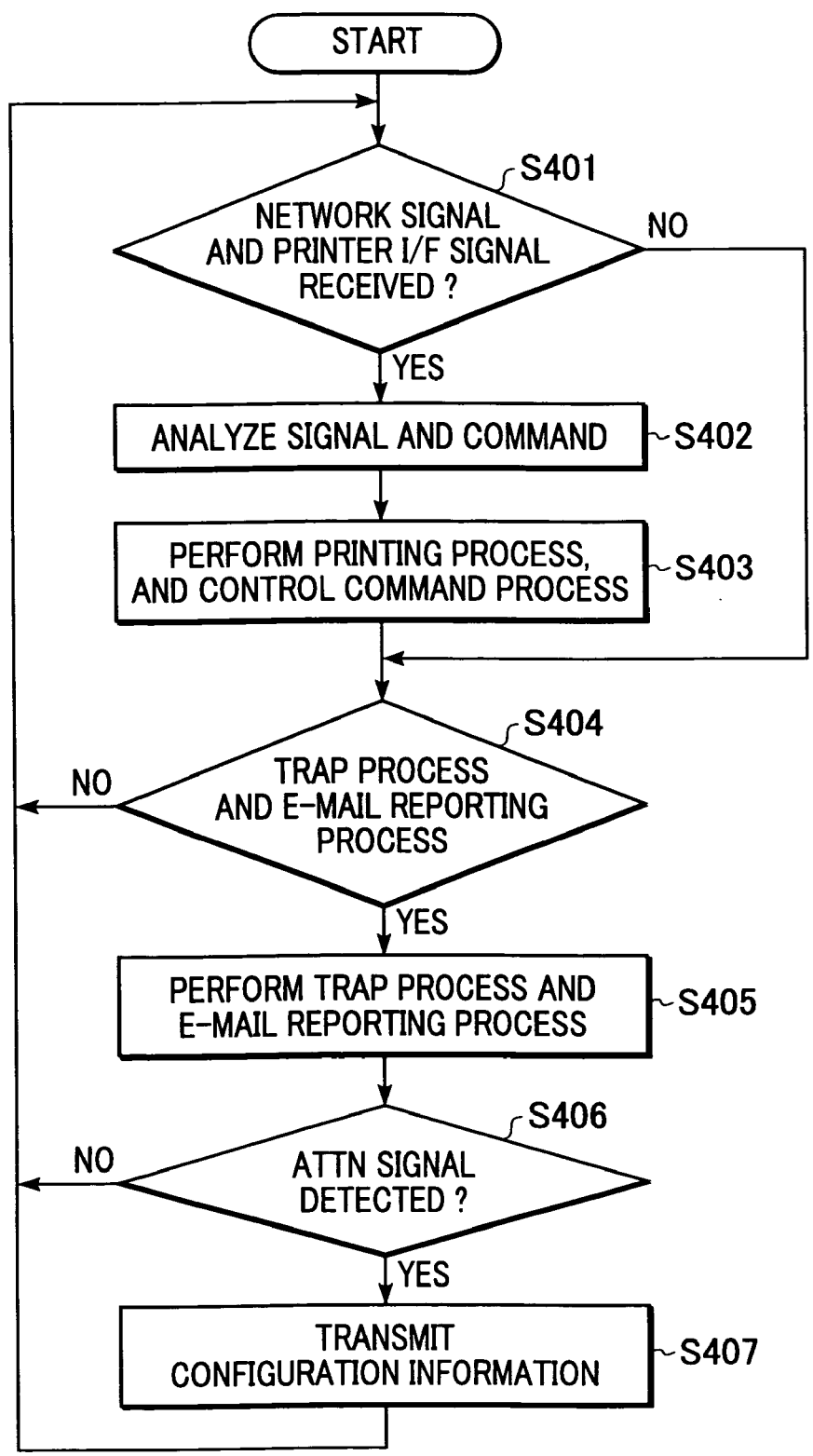
FIG. 4 is a flow diagram illustrating a process of the network interface of FIG. 1.

FIG. 4 is a flow diagram illustrating a process of the network interface 106. In its standard process, the network interface 106 typically performs steps S401 through S405 as shown in FIG. 4. Upon receiving a network signal from the network 100 or a printer I/F signal from the printer interface 205, the network interface 106 proceeds from step S401 to step S402. The network interface 106 analyzes the received signal and command in step S402, and performs processes corresponding to the received signal and command (namely, a printing process and a control command process) in step S403. When print data is received from the network 100, the print data is then transferred to the device main unit 107.

The network interface 106 also performs processes on a non-periodic basis (step S404). These processes include a trap process for notifying the printer device of a status change, and an e-mail reporting process for reporting a log of the printer device through e-mail (step S405). When performing these processes, if the network interface 106 requires information concerning the printer device, the information is acquired through the printer interface 205.

In this preferred embodiment, if the printer interface 205 detects the ATTN signal 213 transmitted from the device main unit 107, the request for the configuration information from the printer device is recognized (step S406). When the request for the configuration information is recognized, the configuration information is organized and then transmitted to the device main unit 107 (step S407). This process is discussed in detail below with reference to FIG. 7. The configuration information is then transferred to the local client 103.

The process of the network interface 106 described above is repeated in response to the detection results in each of steps S401, S404, and S406. A print job is generated based on the transferred configuration information. As a result, the host base system previously described prints the configuration information (configuration information page) of the network interface 106 without using the network.

Figure 5:
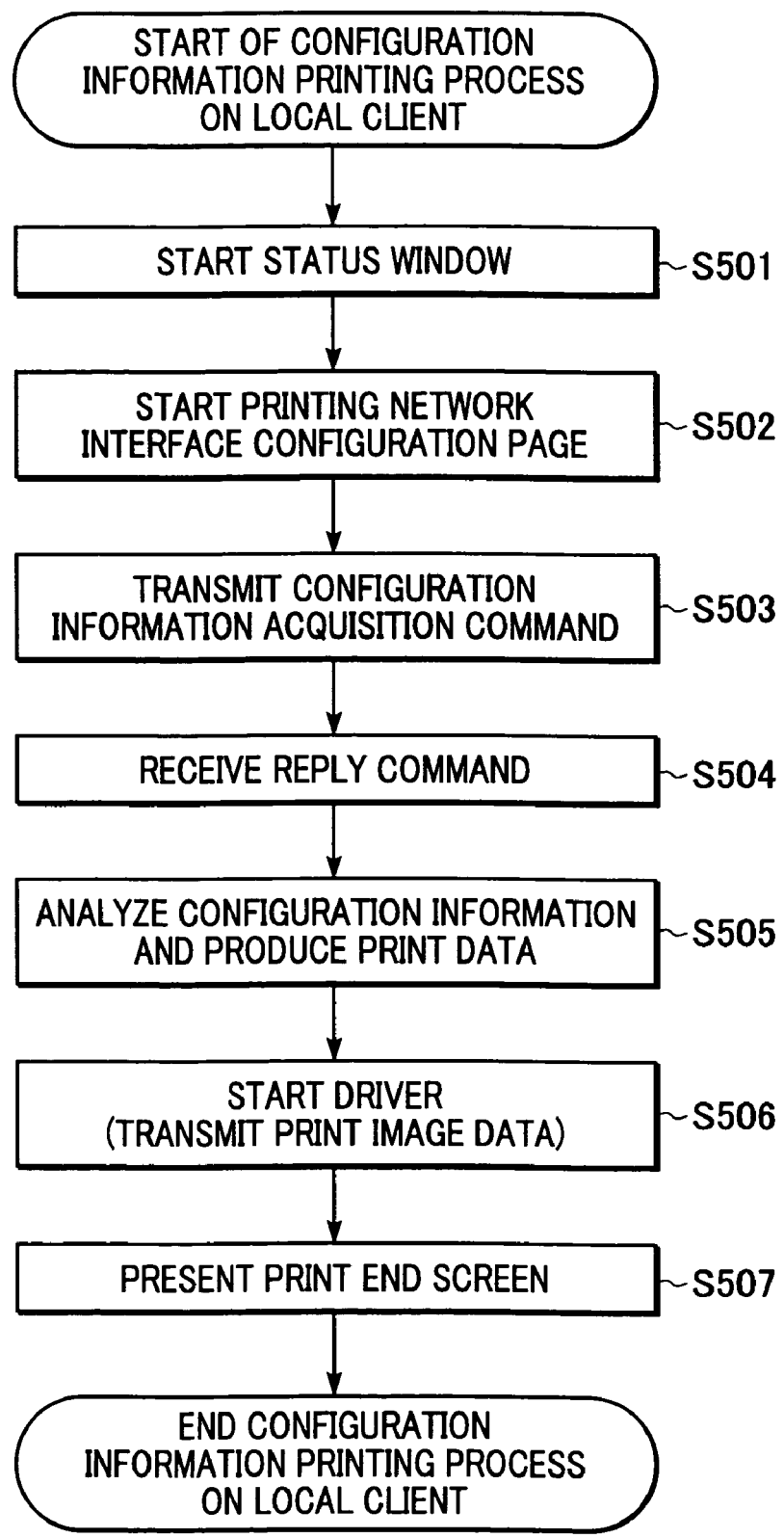
FIG. 5 is a flow diagram illustrating a configuration information printing process of the local client.
Figure 10:
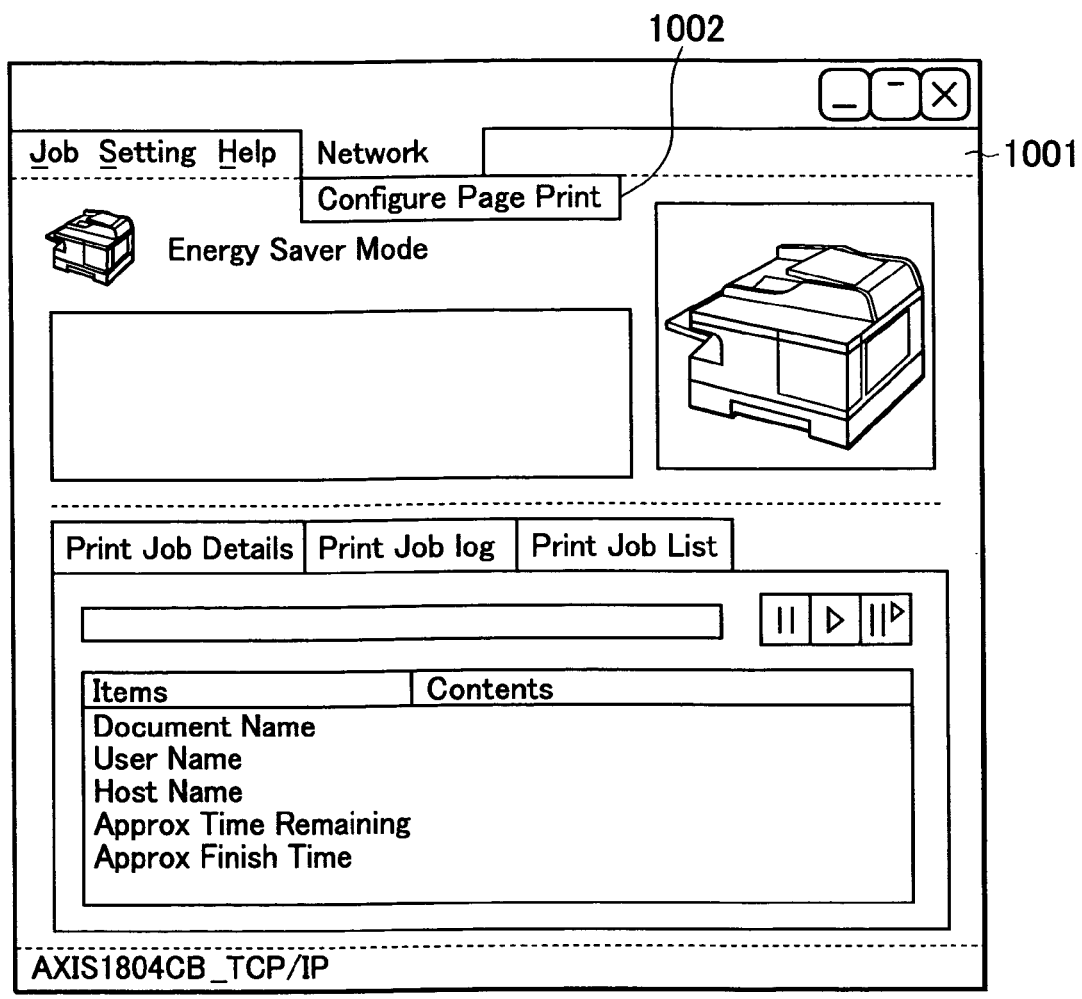
FIG. 10 illustrates a screen example of a status window of a network client of FIG. 3B.

FIG. 5 is a flow diagram illustrating a configuration information printing process of the local client 103. As explained above, installed in the local client 103 are the printer driver 304, the language monitor 303, and the status window 305, which are required to use the printer device. The status window 305 is an application for presenting the status information of the printer device on the display 351 of the local client 103. FIG. 10 illustrates an example of a graphical user interface 1001 displayed on display 351 by the status window 305 of the network 103 client. The language monitor 303 acquires the status information of the printer device 105 from the device main unit 107 through the printer port (port monitor 306) in accordance with control commands communicated between the local client 103 and the device main unit 107. Upon receiving the status information, the status window 305 presents the status information on the display 351 of the local client 103.

When the loading of the network interface 106 in the printer device 105 is detected, a menu 1002 for commanding the printing of the configuration information page of the network interface 106 is added to the graphical user interface 1001 generated by the status window 305.

Returning to FIG. 5, the status window 305 is started in step S501. The status window 305 presents the menu 1002 for commanding the printing of the configuration information. By selecting the menu 1002, a print command to print the configuration information is issued (step S502). Alternatively, a button for printing the configuration information may be presented instead of the menu 1002.

The status window 305 communicates with the language monitor 303, thereby transmitting the print command to the language monitor 303 (step S503). The same process is followed to suspend the job. More specifically, commands are exchanged between the language monitor 303 and the status window 305, and the configuration information print command is added to these commands. The language monitor 303 issues a configuration information acquisition command as one of printer control commands through the printer port (port monitor 306).

In step S504, the language monitor 303 waits for a reply in response to the configuration information acquisition command. As will be discussed later with reference to FIG. 6, the reply command includes the configuration information of the network interface 106. Upon receipt of the reply command in step S504, the language monitor 303 analyzes the configuration information included in the reply command, and generates print data (step S505). The language monitor 303 generates the print data in the same way any other application typically generates print data. More specifically, the configuration information is converted into GDI data, which is then sent to a spooler. In step S506, as is in the case of a typical printing operation, the printer driver 304, converts the GDI data into a print image that is printable on the printer device 105, and then transmits the print image data to the printer device 105. When a status monitor detects a print end state, a screen (not shown) displaying the configuration information print end state is displayed (step S507). The process of the local client 103 is then completed.

Figure 6:
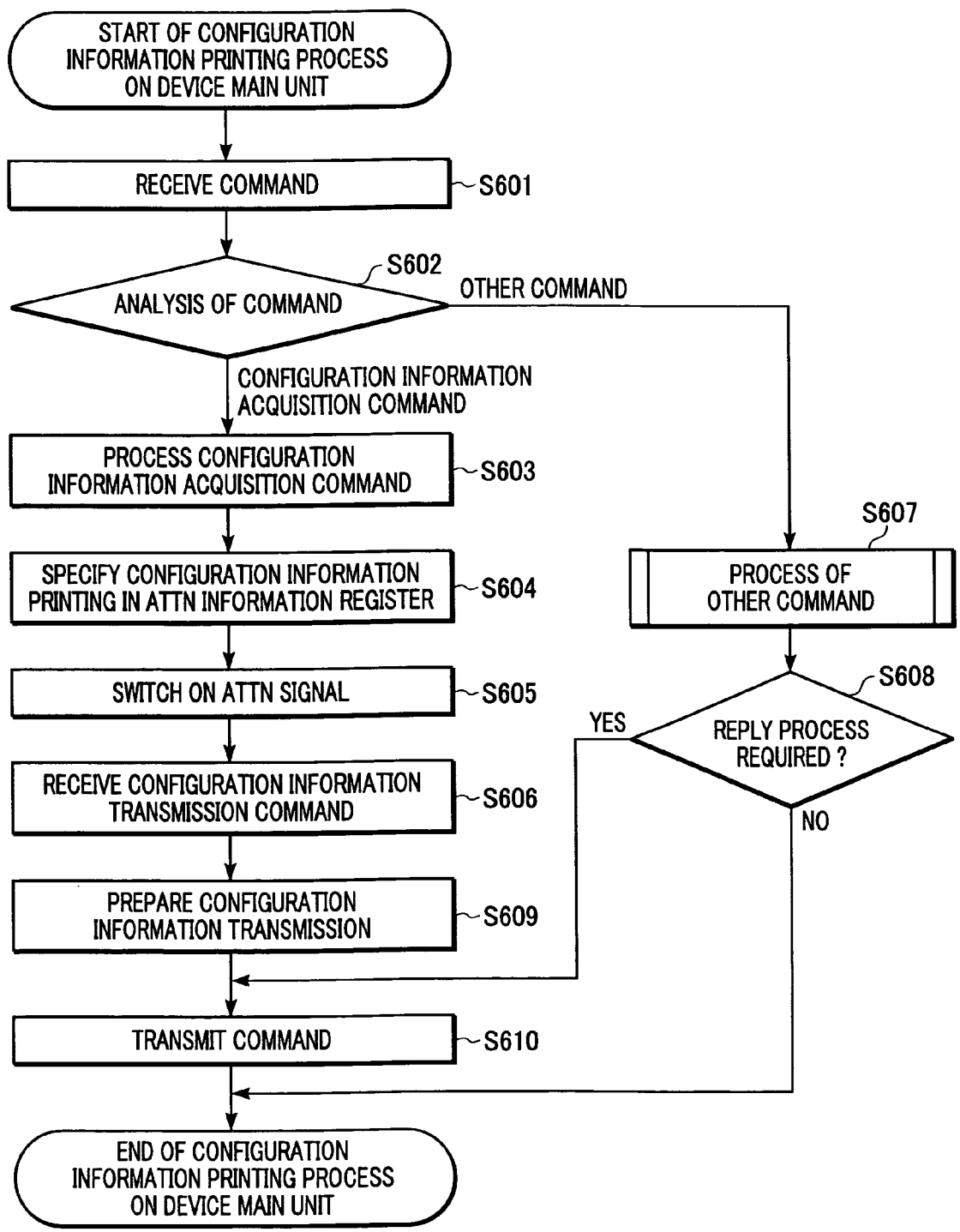
FIG. 6 is a flow diagram illustrating a configuration information printing process of a device main unit of FIG. 1.

FIG. 6 is a flow diagram illustrating a configuration information printing process of the device main unit 107. The device main unit 107 receives and analyzes print data, print commands, and control commands transmitted from the local client 103 (information processing device) (steps S601 and S602). If, in step S602, the device main unit 107 determines that the command is other than a configuration information acquisition command, it performs respective processes in response to the command (step S607). For example, when the print data is received, the device main unit 107 prints the print data. Next, in step S608, a determination is made whether the command received in step S601 requires a reply. When a command requiring a reply is received, the device main unit 107 performs the process corresponding to the command as well as a reply process. Flow then proceeds to step S610, which is described below. In the case of commands that do not require performance of a reply process, such as a print command or an environment setting command, the device main unit 107 only performs the respective processes and the process on the device main unit 107 is completed.

Figure 7:
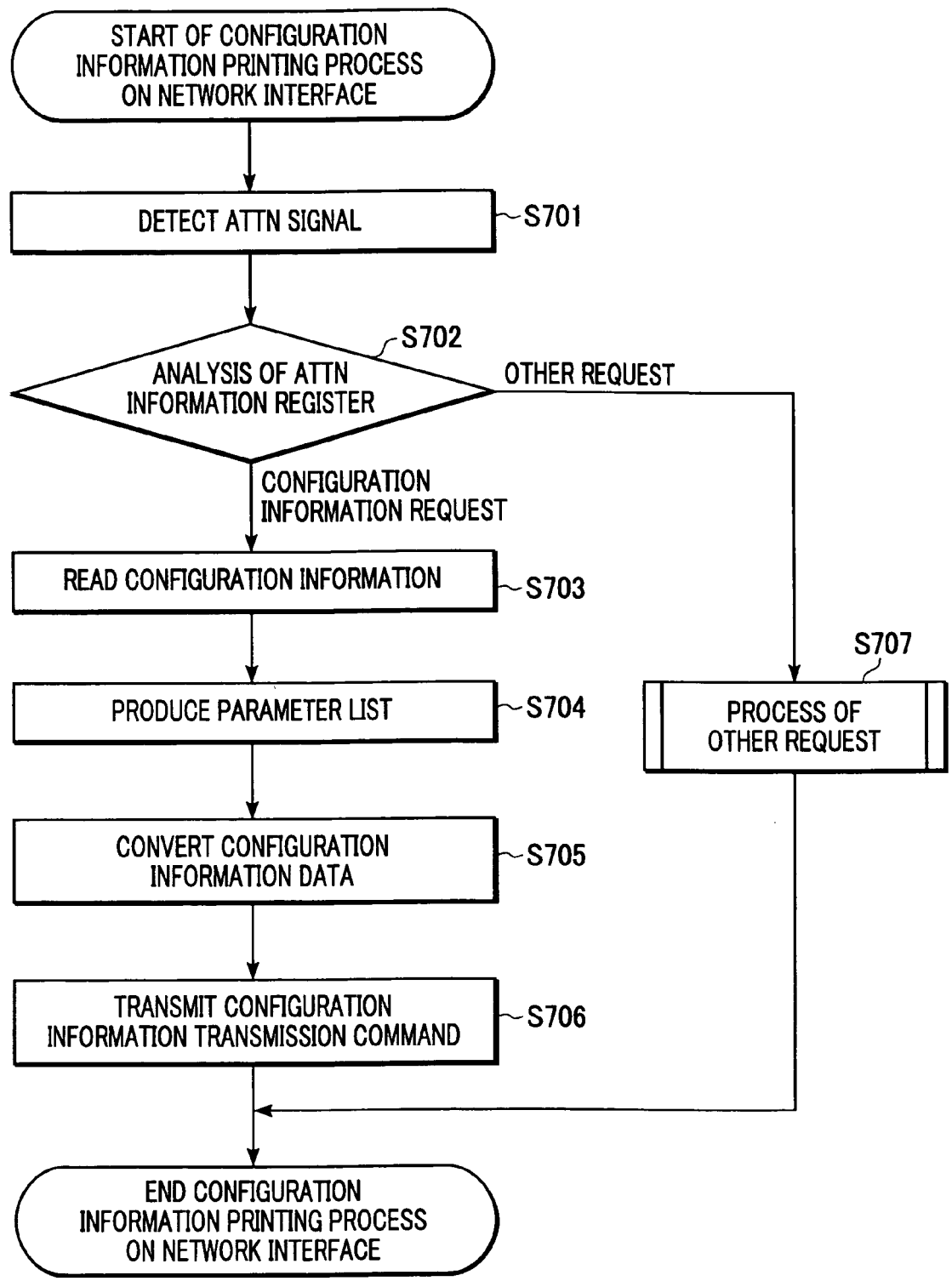
FIG. 7 is a flow diagram illustrating a configuration information printing process of the network interface of FIG. 1.

If it is determined in the command analysis in step S602 that the command is an acquisition command for acquiring the configuration information of the network interface 106, the algorithm proceeds to step S603. The configuration information acquisition command is processed in step S603. More specifically, a configuration information acquisition is specified in an ATTN information register (step S604), and the ATTN signal 213 is switched on (step S605). The network interface 106 detects a trigger for printing the configuration information page, and the process illustrated in FIG. 7 is then started. The device main unit 107 then waits in a standby mode until a configuration information transmission command is received (step S606). Upon receiving the configuration information transmission command, the device main unit 107 prepares to transfer the configuration information transmission, as is, to the local client 103 (step S609). In step S610, the device main unit transmits the configuration information to the local client 103. The process of the device main unit 107 is then completed.

FIG. 7 is a flow diagram illustrating a configuration information printing process of the network interface 106 of the present embodiment.

As previously discussed, the network interface 106 analyzes the control signals exchanged with the printer interface 205 and the device main unit 107, and performs processes corresponding to the control signals (see FIG. 4). When the network interface 106 detects the on state of the ATTN signal 213, the content of the ATTN register is analyzed. The network interface 106 determines whether there is a configuration information acquisition request in the ATTN register (steps S701 and S702). If the network interface 106 determines in step S702 that there is a configuration information acquisition request, the algorithm proceeds to step S703, otherwise the algorithm proceeds to step S707 for processing of the non-configuration information request. An example of such a request may be a request to report a status change.

In step S703, the configuration information is read from one of either the flash ROM 202 or the RAM 203. In step S704, the configuration information of the network interface 106 is produced as a list of set values. In step S705, the configuration information is organized into a predetermined format. FIG. 8 illustrates one example of the format. The format depicted in FIG. 8 is text, and includes information such as parameter names, parameter values, as well as any additional configuration information that can be added as needed. The network interface 106 transfers this information in step S706, together with the configuration information transmission command to the device main unit 107. The process of the network interface 106 is then completed.

Figure 11:
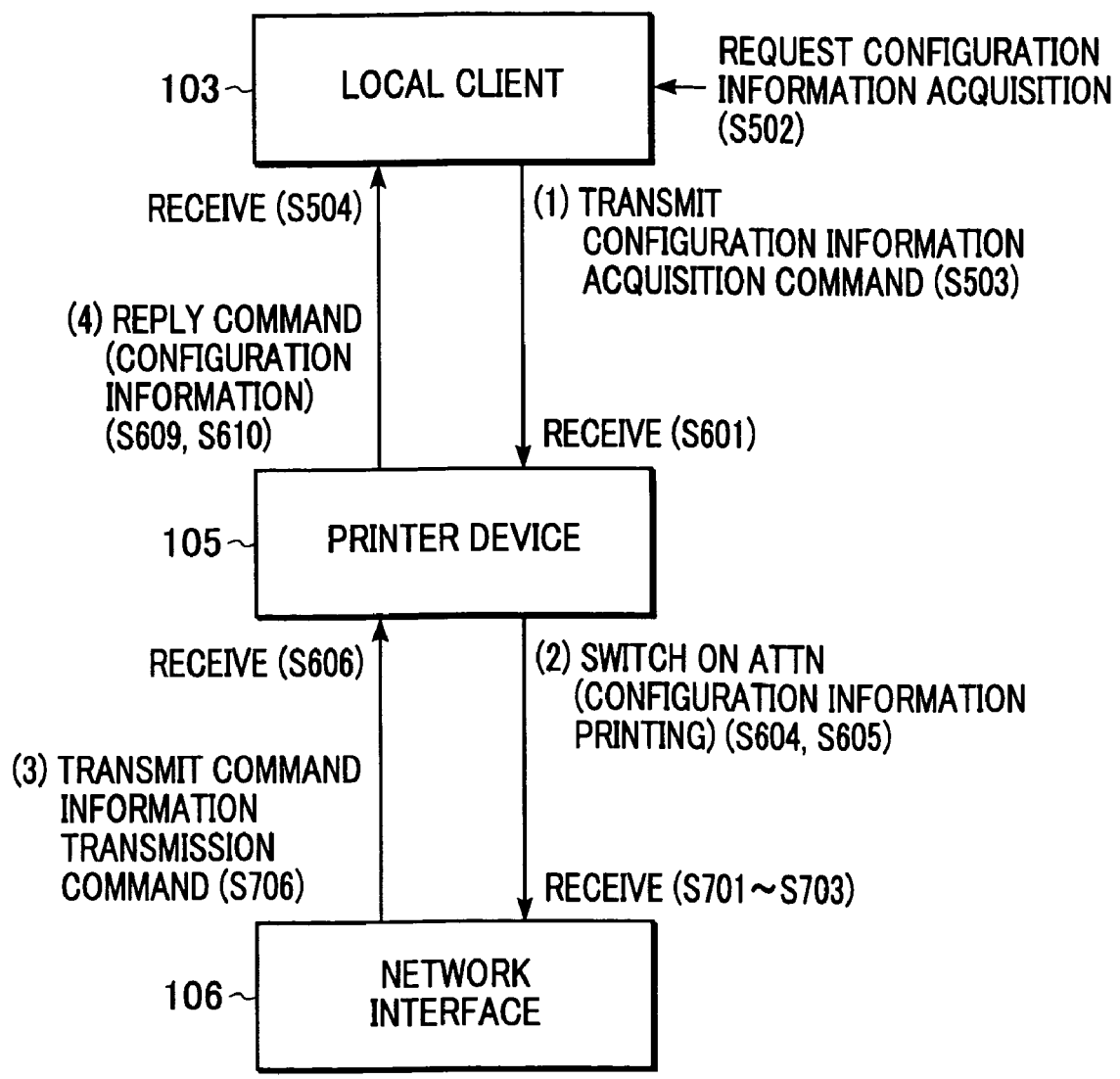
FIG. 11 illustrates a flow of commands and information in a printing operation of the configuration information of the network interface.

The printing process of the configuration information page discussed with respect to FIGS. 4 through 7 is summarized in FIG. 11. If a print instruction is issued through a user interface, for example selecting menu 1002 of FIG. 10, the configuration information acquisition command is issued to the device main unit 107 of printer device 105 (step S503 of FIG. 5). Upon receiving this command, the device main unit 107 describes the configuration information acquisition in the ATTN information register and switches on the ATTN signal 213 (steps S601 through S605 of FIG. 6).

Upon detecting the switch-on of the ATTN signal 213, the network interface 106 analyzes the content of the ATTN information register. If the network interface 106 determines that the content is the configuration information request, the network interface 106 sends the configuration information transmission command containing the configuration information thereof to the device main unit 107 (steps S701-S706 of FIG. 7). Upon receiving the configuration information transmission command, the device main unit 107 transfers, to the local client 103, the configuration information in reply to the configuration information acquisition command received from the local client 103.

As shown in FIG. 8, the configuration information includes network setting parameters representing the operational status of the network interface 106, and information concerning a device connected to the network interface 106, such as operator information, position information, network names, and interface information.

The local client 103 receives the configuration information in reply to the configuration information acquisition command. Based on the received configuration information, the local client 103 generates a print job, thereby causing the device main unit 107 to print out the configuration information page (steps S504-S506 of FIG. 5). More specifically, the printer driver 304 in the local client 103 generates a print job in response to a command from an ordinary application, and further generates a new print job based on the configuration information transmitted from the device main unit 107. FIG. 9 illustrates a printout of the print image data that is generated from the configuration information data of FIG. 8.

When the network interface 106 converts the configuration information (step S705 of FIG. 7), a post-conversion format may contain print/non-print character information, and bold character information depending on a description method. The local client 103, which has received the configuration information, is designed to switch the font and size of the print character string in the print job depending on the format description method.

The local client 103 includes the user interface to request a configuration information print. Such a user interface may also be arranged on the printer device 105 as an operation panel for example. In such a case, the device main unit 107 transfers, to the local client 103, a configuration information print command and the configuration information received from the network interface 106. Upon receiving the information, the local client 103 generates a print job based on the configuration information.

The device main unit 107 of the printer device 105 has been discussed. In a peripheral device having no printing function, such as a scanner, the configuration information of the network interface 106 may be displayed on the display 351 of the local client 103. In this arrangement, a printer device connected in the local connection may print out the configuration information.

In accordance with this preferred embodiment, the environment setting information of the network interface 106 is printed on the printer device under a printing environment where a host PC is used to produce the print data (in the host base system).

The preferred embodiment of the present invention thus overcomes the drawback of a typical host base system that the configuration information of the dedicated network interface 106 directly connected to the printer device is not only printed on the printer device.

In the above-referenced preferred embodiment, the user immediately checks the information set on the network interface 106 on a sheet of paper. When the network environment is modified, or when the setting of the network interface 106 is modified, the user easily verifies the modification while storing parameter settings in the form of sheets of paper. When the network interface 106 is moved from one network environment to another, the knowledge of actually set values help simplify the installation operation of the network interface 106 in the new network environment. In the development of printer devices, the check of the version of the network interface 106 is easily performed.

In another preferred embodiment of the present invention, the configuration information of a network interface is transmitted to a client device (a network client) through a network. The network client generates a print job (namely, print image data) based on the configuration information, and transfers the print job to a printer device through the network. The configuration information is thus printed. This preferred embodiment of the present invention is discussed in detail below.

Figure 12:
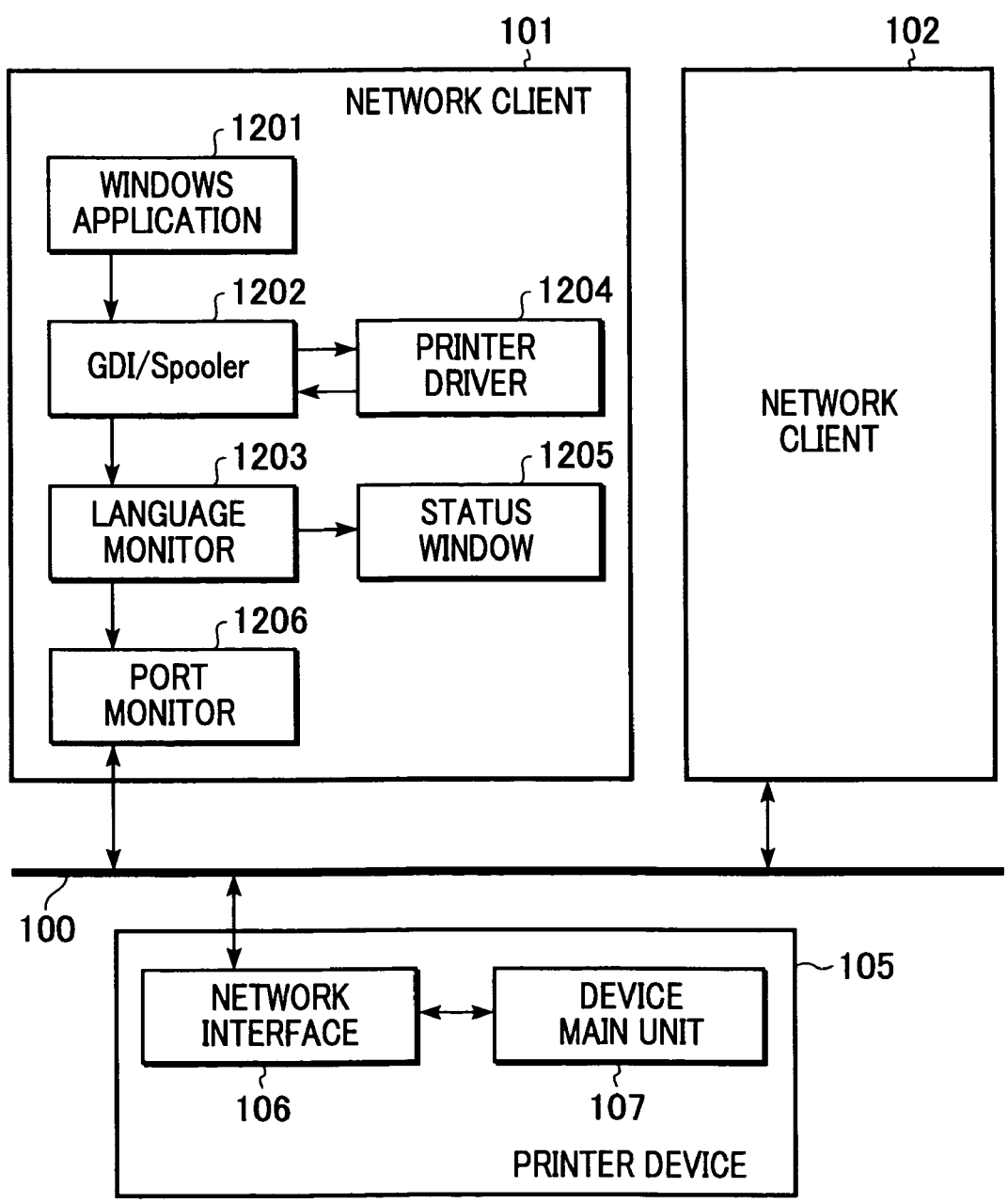
FIG. 12 is a block diagram of a structure of network clients of FIG. 1.

FIG. 12 is a functional block diagram of the network client devices 101 and 102 of FIG. 1. The local clients 101 and 102 preferably use the Windows® operating system, but any operating system that would allow practice of the present invention is applicable.

Windows® application 1201 is a typical application program such as Microsoft Word® or Microsoft Excel®. A GDI/Spooler 1202 performs a spooling function, among other functions, between the application 1201 and a printer driver 1204.

A language monitor 1203 divides the print data generated by the printer driver 1204 on a page-basis, and performs a screen process, a print order process, a collation process, a multi-copying process, and sheet size management process for selecting a sheet feeder on the print data. The resulting print data is transferred to a printer port 1206. The language monitor 1203 also monitors the status of the printer device, and provides a status manager(not shown) with the printing status.

The printer driver 1204 generates image data in a bit-map format in accordance with a command from the application, compresses the image data, and outputs the compressed image data. A status window 1205 receives printer device status information from the language monitor 1203, and displays the status information on a screen of the printer device. The status window 1205 displays a graphical user interface, receives a job control request in response to an input on the graphical user interface, and transfers a job control request to the language monitor 1203. A port monitor 1206 communicates with one of the client devices 101 and 102.

The configuration information of the network interface 106 is printed on the device main unit 107 in the host base system in accordance with the preferred embodiment of the present invention. The printing operation of the host base system is discussed below.

In this preferred embodiment, a printer control command transmitted from the network client through the network is expanded, and a configuration information acquisition command (a command to print the configuration information page) is added to the printer control command. The network interface 106 processes this command, thereby allowing the configuration information thereof to be printed. The printing process of the configuration information in accordance with this preferred embodiment is now discussed.

Figure 13:
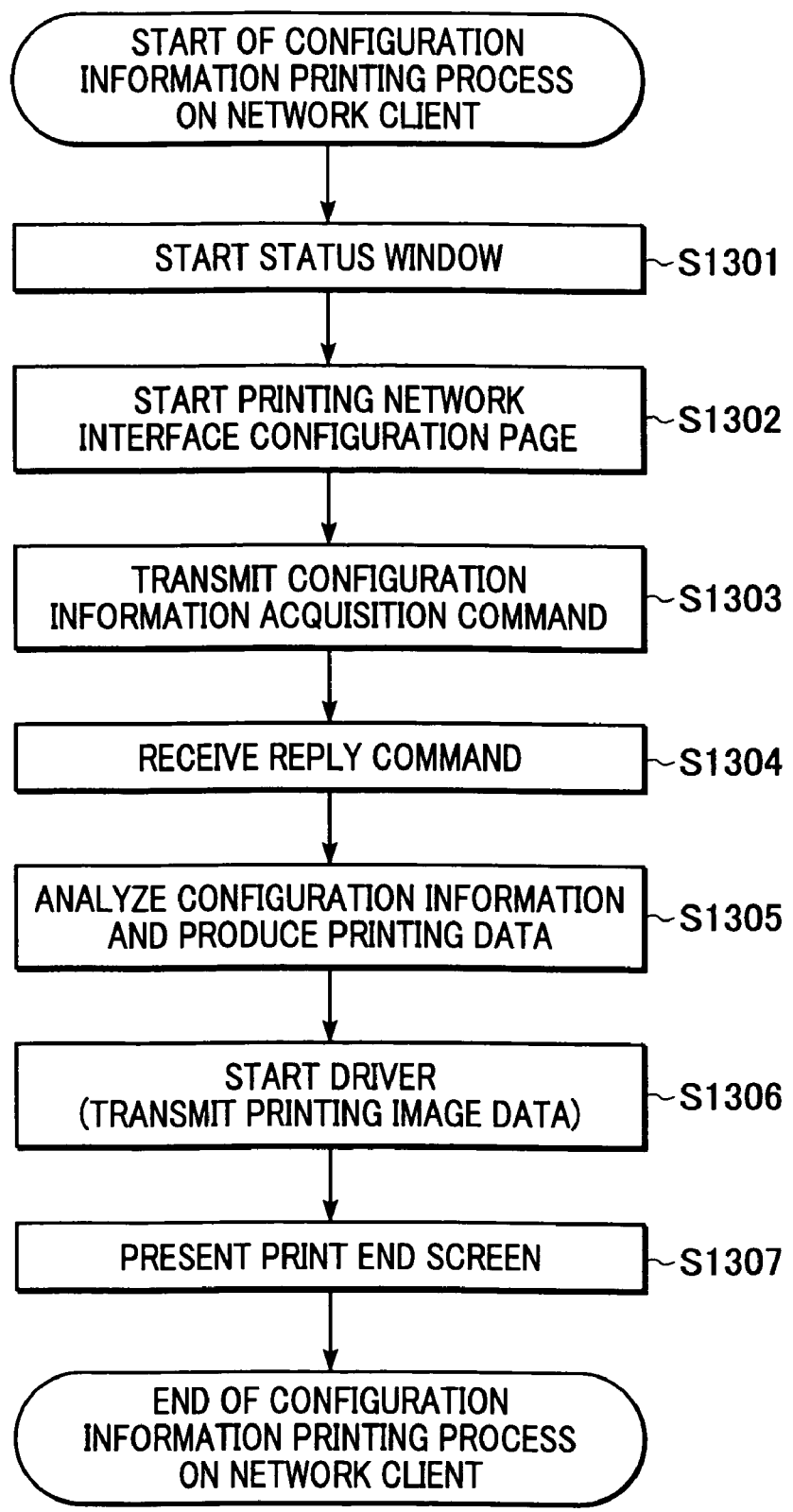
FIG. 13 is a flow diagram illustrating a configuration information printing process of the client device of FIG. 12.
Figure 14:
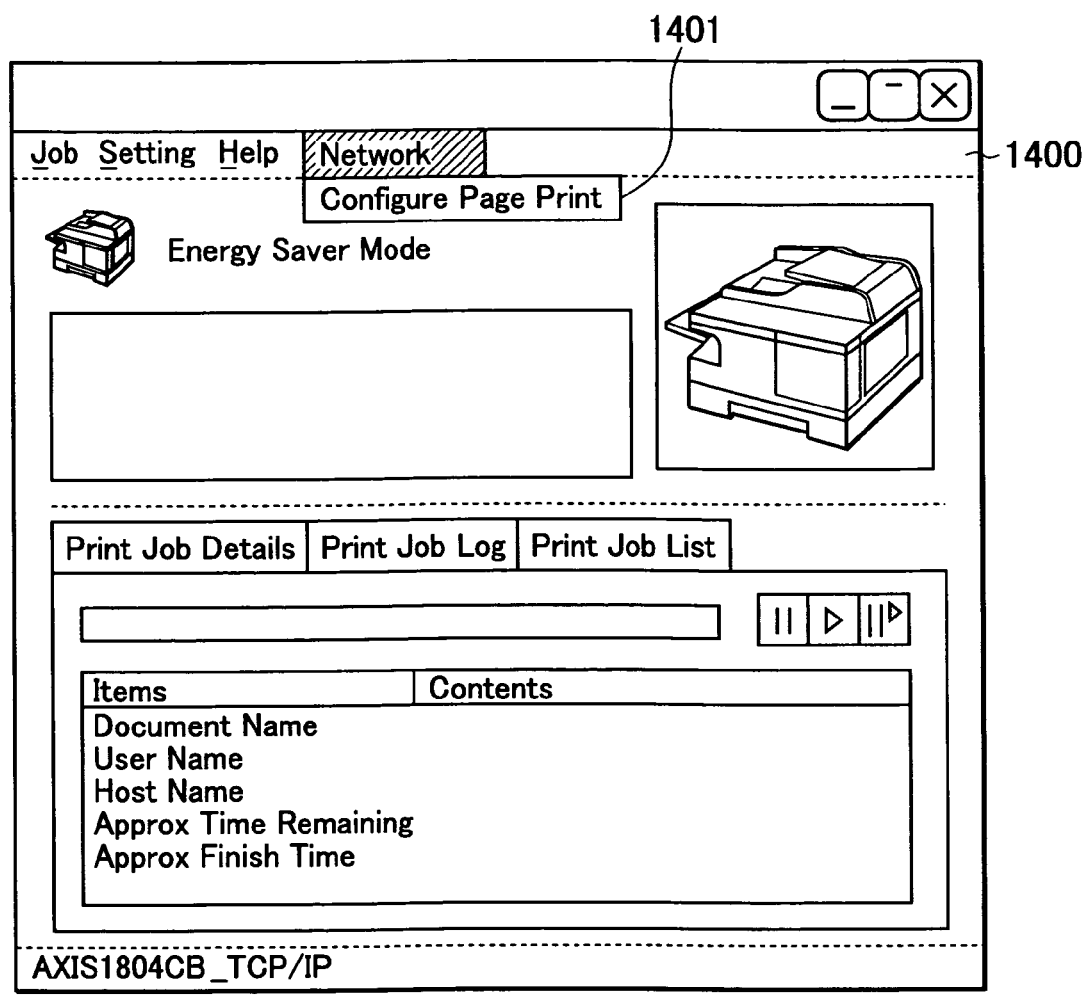
FIG. 14 illustrates a screen example of a status window in the client device of FIG. 12.

FIG. 13 is a flow diagram illustrating a configuration information printing process of the network client devices 101 and 102. Since network client devices 101 and 102 are identical, for description purposes, hereinafter references will only be made to network client device 101, but are applicable to network client device 102. Installed in the network client device 101 are the printer driver 1204, the language monitor 1203, and the status window 1205, which are required for using the printer device. The status window 1205 is an application for presenting the status information of the printer device on the screen (i.e., display 351) of the network client device 101. FIG. 14 illustrates an example of graphical user interface 1400 displayed on the screen of the network client device 101 by the status window 1205. The language monitor 1203 acquires the status information of the printer device 105 from the device main unit 107 through the network in accordance with control commands communicated between the network client device 101 and the device main unit 107. Upon receiving the status information, the status window 1205 presents the status information on the screen of the network client device 101.

When the loading of the network interface 106 in the printer device 105 is detected, a menu 1401 for commanding the printing of the configuration information page of the network interface 106 is added to the graphical user interface 1400 generated by the status window 1205.

Returning to FIG. 13, the status window 1205 is started in step S1301. The status window 1205 presents the menu 1401 for commanding the printing of the configuration information. By selecting the menu 1401, a print command to print the configuration information is issued (step S1302). Alternatively, a button for printing the configuration information may be presented instead of the menu 1401.

The status window 1205 communicates with the language monitor 1203, thereby transmitting the print command to the language monitor 1203 (step S1303). The same process is followed to temporarily suspend the job. More specifically, commands are exchanged between the language monitor 1203 and the status window 1205, and the configuration information print command is added to these commands. The language monitor 1203 issues a configuration information acquisition command as one of printer control commands through the port monitor 1206.

In step S1304, the language monitor 1203 waits for a reply in response to the configuration information acquisition command. As will be discussed later, the reply command includes the configuration information of the network interface 106. Upon receipt of the reply command in step S1304, the language monitor 1203 analyzes the configuration information included in the reply command, and generates print data (step S1305). The language monitor 1203 generates the print data in the same way as any other application typically generates print data. More specifically, the language monitor 1203 converts the configuration information into GDI data, which is then sent to a spooler. In step S1306, as is in the case of a typical printing operation, the printer driver 1204 converts the GDI data into a print image that is printable on the printer device 105. The print image data is then transmitted from the network client device 101 to the network interface 106, and then from the network interface 106 to the device main unit 107. The printer device 105 prints out images in response to the image data. When a status monitor detects a print end state, a screen (now shown) displaying the configuration information print end state is displayed (step S1307). The process of the network client is then completed.

Figure 15:
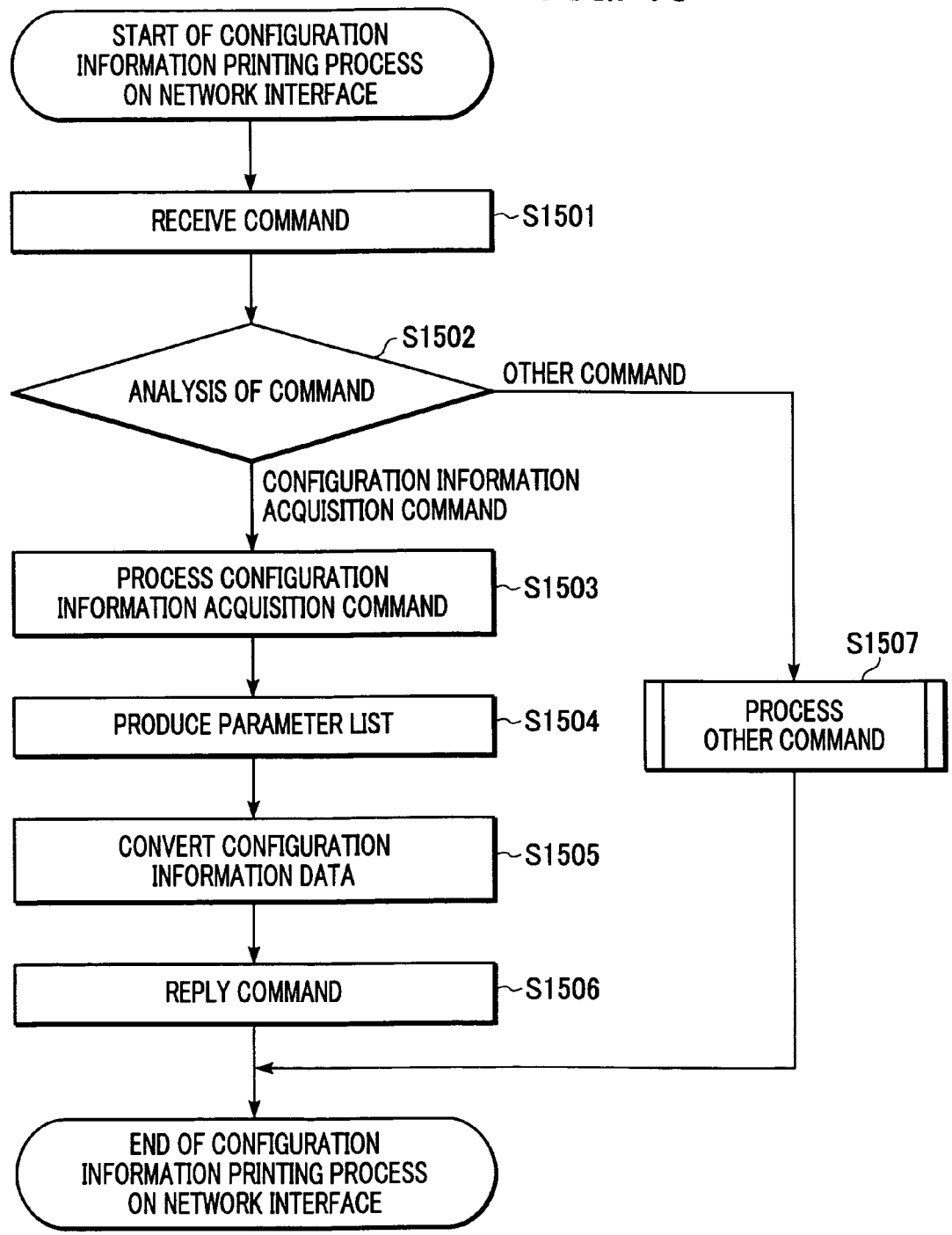
FIG. 15 is a flow diagram illustrating a process of printing the configuration information of the network interface of FIG. 12.

The network interface 106 analyzes the control signal received from the network as already discussed, and performs a process corresponding to the signal (see FIG. 4). FIG. 15 is a flow diagram illustrating a process of printing the configuration information of the network interface 106 of the present embodiment. When the network interface 106 detects a command from the network, the content of the command is analyzed (steps S1501 and S1502). If the network interface 106 determines in step S1502 that the command is a configuration information acquisition command, step S1503 and subsequent steps are executed. If the command is something other than a configuration information acquisition command, the algorithm proceeds to step S1507, where a process corresponding to the command is performed. The command may be for an ordinary printing process or a control process, and the process is performed in the same way as the conventional process.

In step S1503, the configuration information is read from one of either the flash ROM 202 or the RAM 203. In step S1504, the configuration information of the network interface 106 is produced as a list of set values. In step S1505, the configuration information is organized into a predetermined format. FIG. 8 illustrates one example of the format. The network interface 106 transfers the information illustrated in FIG. 8 as a reply to the configuration information acquisition command to the client device 101 (step S1506). Upon receiving the reply, the client device 101 generates a print job based on the configuration information contained in the reply, as described with reference to FIG. 13, and transfers the print job to the printer device 105. The device main unit 107 prints out the configuration information in accordance with the print job. FIG. 9 illustrates a printout of the configuration information data. As shown, the configuration information includes a variety of pieces of information.

As described above, the printing system of the present invention includes the printer device and the information processing device connected to the printer device through the network. The information processing device (the client devices 101 and 102) acquires the configuration information from the network interface 106 connected to the network (step S1304 of FIG. 13), and generates the print job based on the acquired configuration information (step S1305 of FIG. 13). The printer device prints out the configuration information page in accordance with the print job (step S1306 of FIG. 13).

The client device, which is essential to the network system, collects the configuration information from the network interface, and causes the printer to print out the configuration information. The configuration information of the network interface is printed in the host base system.

In the above-referenced preferred embodiment, the user immediately checks the information set on the network interface 106 on a sheet of paper. When the network environment is modified, or when the setting of the network interface 106 is modified, the user easily verifies the modification while storing parameter settings in the form of sheets of paper. In the development of printer devices, the check of the version of the network interface 106 is easily performed.

In accordance the preferred embodiment of the present invention, the network interface is a network board or a network card to connect the printer device to the network. The present invention is not limited to the printer device. The present invention is applicable to print the configuration information of a network interface of a scanner. A host device acquires the configuration information from the network interface of the scanner, generates a print job, and transmits the print job to a printer device on the network.

In the above-referenced preferred embodiment, the information processing device (the client device) issues the command requesting the configuration information to the network interface 106 (step S1303 of FIG. 13). The network interface 106 transmits the configuration information described in a predetermined format to the information processing device in response to the command (steps S1502-S1506 of FIG. 15). To issue the command requesting the configuration information, an operational interface requiring the acquisition of the configuration information is presented on the user interface display provided by a driver of a peripheral device connected to the network interface (see FIG. 14). The command is used in response to an operation on the interface.

In accordance the preferred embodiment, the produced print job contains the image data based on the configuration information. In this way, the host base printing system prints the configuration information of the network interface.

When the network interface 106 converts the configuration information (step S1505 of FIG. 15), a post-conversion format may contain print/non-print character information, and bold character information depending on a description method. The local client device 101, which has received the configuration information, is designed to switch the font and size of the print character string in the print job depending on the format description method.

The local client device 101 includes the user interface to issue a configuration information print command. Such a user interface may also be arranged on the printer device 105 as an operation panel for example. In such a case, the device main unit 107 transfers a configuration information print command to the network interface 106. Upon receiving the command, the network interface 106 transfers the configuration information thereof and the configuration information print command to the predetermined client device 101. The client device 101 then generates the print job based on the configuration information, and causes the printer device 105 to perform a printing operation.

The configuration information includes network setting parameters representing the operational status of the network interface 106, and information concerning a peripheral device connected to the network interface 106. The information concerning the peripheral device contains among other things, operator information, position information, network name, and interface information.

The above-referenced preferred embodiment of the present invention provides the information processing device as a client computer appropriate for the printing system and the network interface. The information processing device, communicating with the printer device through the network, acquires the configuration information from the network interface 106 (steps S1303 and S1304 of FIG. 13), generates the print job based on the acquired configuration information (step S1305 of FIG. 13), and transmits the generated print job to the printer device (step S1306 of FIG. 13).

To acquire the configuration information, the command requesting the configuration information is issued to the network interface. The configuration information described in the predetermined format is received from the network interface in response to the command.

The network interface connects the network to peripheral devices. The network interface determines the type of commands received through the network (step S1502 of FIG. 15). If the network interface determines that the received command is the configuration information requesting command, the network interface generates the configuration information thereof described in the predetermined format (steps S1503-S1505 of FIG. 15), and then transmits the generated data over the network in reply to the configuration information requesting command (step S1506 of FIG. 15).

A storage medium storing a program code of software for carrying out the functions of the above-described embodiments is loaded in a system or apparatus. A computer (a CPU or an MPU) in the system or apparatus reads and executes the program code from the storage medium, thus achieving the object of the present invention.

Since the program code of software performs the functions of the above-described embodiment, the program code itself, and means for providing the program code to the computer, for example, a storage medium for storing the program code, fall within the scope of the present invention.

Storage media for providing the program code include, but are not limited to, a floppy disk, a hard disk, an optical disk, a magneto-optical disk, a CD-ROM, a CD-R, a magnetic tape, a nonvolatile memory card, ROM, and the like.

By executing the program code read by the computer, the functions of the above-described embodiments are performed. Furthermore, the operating system running on the computer performs the process in whole or in part in response to instructions from the program code. The functions of the above-preferred embodiments are thus carried out. Such an arrangement falls within the scope of the present invention.

The program code from the storage medium is read into a memory incorporated in a feature expansion board in the computer or in a feature expansion unit connected to the computer. The CPU mounted on the feature expansion board or the feature expansion unit performs partially or entirely the actual process in response to the instruction from the program code. The functions of the above-described embodiments are executed through the process. Such a program code falls within the scope of the present invention.

The present invention thus provides a new printing system for printing the configuration information of the network interface. The conventional host base system has either been unable to print the configuration information or has been able to print the configuration information but at an extremely inefficient manner. The system of the present invention allows the configuration information to be easily printed out.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing system comprising:
   a print control device;
   a network interface device for connecting the print control device to a network;

an information processing device that is connected to the print control device through an interface different from the network interface device;

an input unit for inputting a print instruction for printing configuration information of the network interface device according to a user operation;

an acquisition unit, arranged in the print control device, for acquiring the configuration information representing a configuration of the network interface device from the network interface device when the print instruction is input;

a transmitting unit for transmitting the configuration information acquired by the acquisition unit from the print control device to the information processing device through the interface different from the network interface device;

a generating unit, arranged in the information processing device, for generating print data representing the configuration information of the network interface device based on the configuration information transmitted from the transmitting unit; and a printing unit, arranged in the print control device, for printing the print data generated by the generating unit.

2. A printing system according to claim 1, further comprising:

a command transmitting unit for transmitting, from the information processing device to the print control device, a command to acquire the configuration information in response to the print instruction; and a print data transmitting unit for transmitting the print data generated by the generating unit from the information processing device to the print control device through the interface different from the network interface device.

3. A printing system according to claim 1, wherein the acquisition unit transmits a signal to the network interface device through a dedicated signal line to acquire the configuration information of the network interface device.

4. A printing system according to claim 1, further comprising, in the network interface unit, a configuration information generator for generating the configuration information in a predetermined format, wherein the acquisition unit acquires the configuration information set in the predetermined format.

5. A printing system comprising:

a print control device;

a network interface device for connecting the print control device to a network;

an information processing device that is connected to the network;

an input unit for inputting a print instruction for printing configuration information of the network interface device according to a user operation;

an acquisition unit, arranged in the information processing device, for acquiring the configuration information representing a configuration of the network interface device from the network interface device through the network when the print instruction is input;

a generating unit, arranged in the information processing device, for generating print data representing the configuration information of the network interface device based on the configuration information acquired by the acquisition unit; and a printing unit, arranged in the print control device, for printing the print data generated by the generating unit.

6. A printing system according to claim 5, further comprising:

a command transmitting unit for transmitting, from the information processing device to the network interface device, a command to acquire the configuration information in response to the print instruction;

a first print data transmitting unit for transmitting the print data generated by the generating unit from the information processing device to the network interface device through the network; and a second print data transmitting unit for transmitting, from the network interface device to the print control device, the print data transmitted from the first print data transmitting unit.

7. A printing system according to claim 5, further comprising a generator, arranged in the network interface device, for generating the configuration information in a predetermined format, wherein the acquisition unit acquires the configuration information set in the predetermined format.

8. A printing method for printing configuration information of a network interface device that connects a print control device to a network, the printing method comprising:

an inputting step for inputting a print instruction for printing configuration information of the network interface device according to a user operation;

an acquisition step, performed by the print control device, for acquiring the configuration information representing a configuration of the network interface device from the network interface device when the print instruction is input;

a transmitting step for transmitting the configuration information acquired in the acquisition step from the print control device to an information processing device through an interface different from the network interface device;

a generating step, performed by the information processing device, for generating print data representing the configuration information of the network interface device based on the configuration information transmitted in the transmitting step;

a print data transmitting step for transmitting the print data generated in the generating step from the information processing device to the print control device through the interface different from the network interface device; and a printing step for printing the print data transmitted in the print data transmitting step.

9. A printing method for printing configuration information of a network interface device that connects a print control device to a network, the printing method comprising:

an inputting step for inputting a print instruction for printing configuration information of the network interface device according to a user operation;

an acquisition step, performed by an information processing device, for acquiring the configuration information representing a configuration of the network interface device from the network interface device through the network when the print instruction is input;

a generating step, performed by the information processing device, for generating print data representing the configuration of the network interface device based on the configuration information acquired in the acquisition step;

a first print data transmitting step for transmitting the print data generated in the generating step from the information processing device to the network interface device through the network;

a second print data transmitting step for transmitting the print data, transmitted in the first print data transmitting step, from the network interface device to the print control device; and a printing step for printing the print data transmitted in the second print data transmitting step.

10. A computer-readable storage medium storing a computer program for causing a computer to print configuration information of a network interface device that connects a print control device to a network, the computer program comprising program codes for performing:

an inputting step for inputting a print instruction for printing the configuration information of the network interface device according to a user operation;

an acquisition step for acquiring, through an interface different from the network interface device, the configuration information representing a configuration of the network interface device from the print control device that has acquired the configuration information when the print instruction is input; and a generating step for generating print data representing the configuration of the network interface device based on the configuration information acquired in the acquisition step; and a printing step, performed by the print control device, for printing the print data generated in the generating step.

11. A computer-readable storage medium according to claim 10, further comprises program code for performing a display step for displaying one of a button and a menu, each commanding a printing of the configuration information of the network interface device when a connection of the network interface device to the print control device is detected.

12. A computer-readable storage medium storing a computer program for causing a computer to print configuration information of a network interface device that connects a print control device to a network, the computer program comprising program codes for performing:

an inputting step for inputting a print instruction for printing the configuration information of the network interface device according to a user operation;

an acquisition step, performed by an information processing device, for acquiring the configuration information representing a configuration of the network interface device from the network interface device through the network when the print instruction is input;

a generating step, performed by the information processing device, for generating print data representing the configuration information of the network interface device based on the configuration information acquired in the acquisition step; and a printing step, performed by the print control device, for printing the print data generated in the generating step.

13. A computer-readable storage medium according to claim 12, further comprises program code for performing a display step for displaying one of a button and a menu, each commanding a printing of the configuration information of the network interface device when a connection of the network interface device to the print control device is detected.

* * * * *